United States Patent [19]
Miller

[11] Patent Number: 5,951,766
[45] Date of Patent: Sep. 14, 1999

[54] APPARATUS FOR DEPOSITING A VISCOUS FLUID MATERIAL

[75] Inventor: Robert C. Miller, Battle Creek, Mich.

[73] Assignee: Kellogg Company, Battle Creek, Mich.

[21] Appl. No.: 08/641,512

[22] Filed: May 1, 1996

[51] Int. Cl.⁶ .................................................. B05C 5/00
[52] U.S. Cl. ...................... 118/667; 118/679; 118/712; 118/13; 118/14; 118/16; 118/24; 118/302; 118/313; 118/315; 118/323; 118/324
[58] Field of Search ................................ 118/667, 679, 118/712, 13, 14, 16, 24, 26, 29, 30, 302, 313, 315, 323, 324; 239/225.1, 236, 243, 263.2, 263.3; 426/302, 307, 496

[56] References Cited

U.S. PATENT DOCUMENTS

| | | |
|---|---|---|
| 1,771,117 | 7/1930 | Greer . |
| 2,855,891 | 10/1958 | Schmied . |
| 3,164,490 | 1/1965 | Evanson et al. . |
| 3,185,129 | 5/1965 | Sollich . |
| 3,427,650 | 2/1969 | Woody . |
| 3,998,387 | 12/1976 | Maasberg . |
| 4,932,353 | 6/1990 | Kawata et al. . |
| 5,209,779 | 5/1993 | Talerico . |

*Primary Examiner*—Laura Edwards
*Attorney, Agent, or Firm*—Fulbright & Jaworski, LLP

[57] ABSTRACT

Disclosed is an apparatus for depositing a viscous flowable mass to coat or decorate the surface of a product. The apparatus has a linearly moveable manifold assembly with at least one nozzle for depositing the viscous material on the surface of a product passing beneath the nozzle, a counterbalance eccentric drive system, and a linear motion assembly connected to the drive system and manifold assembly. At least one of the assembly and nozzle is heat traced and controlled so as to maintain the temperature of the viscous material in a range such that the material is flowable. By changing at least one of (a) the speed of the moving manifold assembly, (b) the speed of the product under the nozzle, and (c) the stroke length, the product surface can be ornamented in a variety of ways. The apparatus is particularly useful for decorating a food product with icing.

16 Claims, 4 Drawing Sheets

APPARATUS FOR DEPOSITING A VISCOUS FLUID MATERIAL

BACKGROUND OF THE INVENTION

The present invention is in an apparatus for depositing a viscous fluid mass containing a material capable of crystallizing and/or a gelatin-like material to form an ornamental design on a surface of a product such as pastries and the like and, in particular, in an apparatus known as a string icing depositor.

In the manufacture of food products such as candies, cakes and pastries, it is desirable to decorate the product surface with an ornamental design or pattern or otherwise decorate a surface, usually the top or outer-most surface of the candy, cake or pastry. The decorating material is usually a viscous flowable mass such as a paste and is generally a confectionery product such as a sugar-water mixture and/or a fatty material such as a chocolate.

A longstanding problem in the production of such products is that the decorating material generally contains components which may undergo large viscosity or even phase changes, i.e., hardening, depending on the compositional make-up of the mass. Such changes in consistency or phase often are a source of operational difficulties in the apparatus. The viscosity or phase changes cause plugging and can result in non-uniform or varying designs. The build-up can result in plugging which not only causes the apparatus to malfunction but also raises concerns about the manufacturing practices. Plugging results in shutdowns for cleaning and downtiming. Obviously, frequent pluggings cause loss of actual production capability.

Another disadvantage is that the number of decorative designs that can be generated by a single system is limited, especially when the decorative material contains components likely to undergo viscosity or phase changes. The design limitations arise from the fact that hand decoration cannot be employed economically or practically for commercial scale production quantities and available mechanical decorating equipment is limited to either only one design or a relatively small number of designs. Thus, to obtain an acceptable and sufficient number of design variations, a number of machines with different design capabilities are required.

However, economic concerns are an underlying consideration since to produce a large number of designs one would either require 1) a large number of machines, or 2) the ability to adapt one or a few machines to provide different patterns. The first approach requires increased capital investment, increased maintenance scheduling and additional spare parts and operating personnel familiar with the numerous machines. The second approach requires extended machine downtime for modification or adaptation and restart-up. Neither approach is satisfactory.

SUMMARY OF THE INVENTION

The present invention is in an apparatus for depositing a viscous flowable mass, such as an icing, or other material capable of or containing crystallizing components and/or gelatin-like materials and/or fatty-based substances for decorating food products such as candies, cakes, pastries and the like and especially in an apparatus for the continuous depositing of an icing or a like material in definite or random patterns which can be easily varied by design and/or color.

The apparatus of the invention is a viscous fluid depositing machine, including a drive system attached to a linear motion assembly and a fluid depositing system. The fluid depositing system is moveable relative to a conveyor system on which the food product or the like is carried. The apparatus is formed of adjustable components enabling the adjustment of orientation, speed, nozzle position, stroke length, stroke frequency, speed differential and degree of coverage so as to enable the formation of a large number of patterns with varying degrees of intricacy and degree of surface coverage. The apparatus of the invention includes a reciprocating system for movement of the depositing nozzles relative to the surface to be decorated and a heating system for maintaining the viscous flowable mass in a proper condition for depositing onto a product surface and of suitable fluidity to inhibit, or minimize, undesired viscosity changes or other changes retarding flowability so as to enable repeated and faithful formation of the desired surface ornamentation.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

DESCRIPTION OF THE PREFERRED EMBODIMENT

Figure 1:
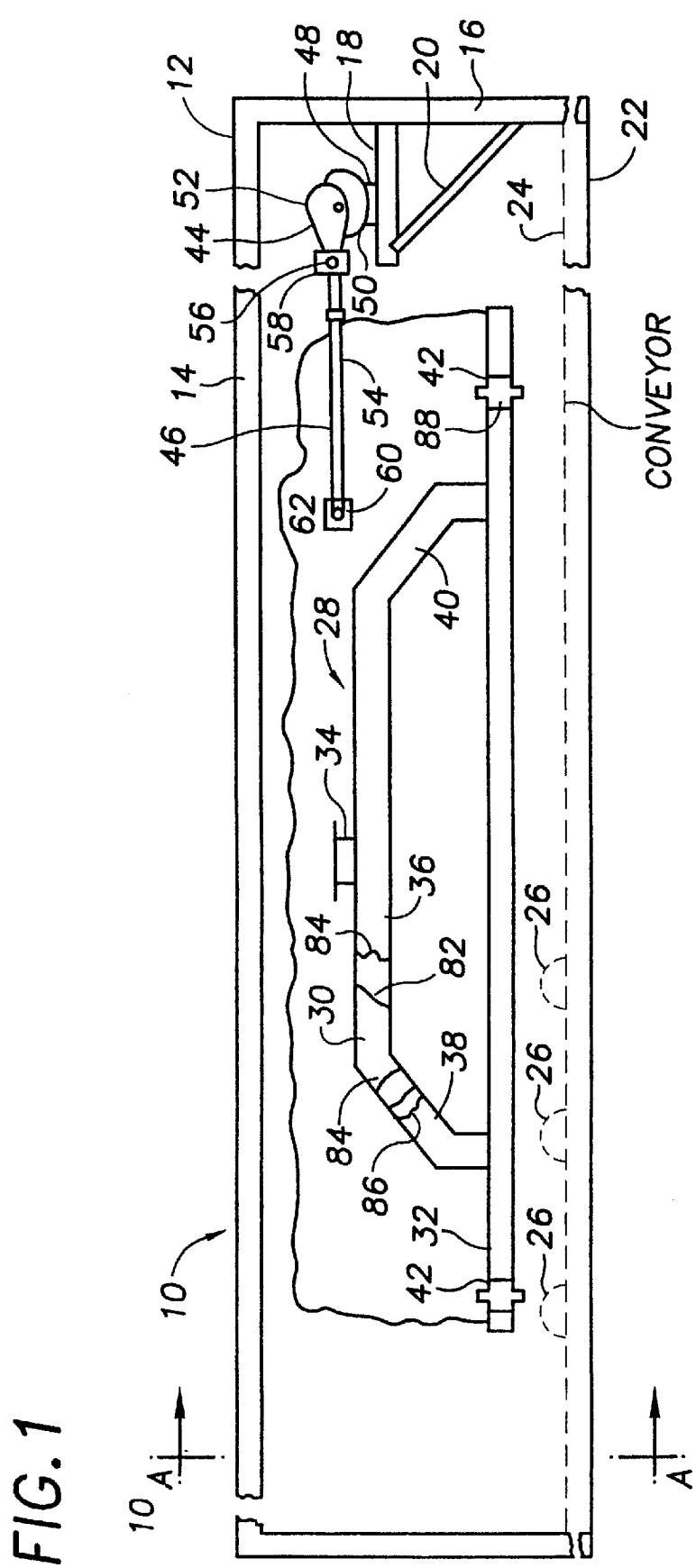
FIG. 1 shows a partial front elevation view of an apparatus of the invention.

Referring to the drawings, FIG. 1 shows a partial front elevation view of an apparatus 10 for depositing a flowable viscous mass.

Apparatus 10 is supported by a support structure 12 formed of horizontal beams 14 and vertical beams 16. A support platform 18 extends from support 16. The platform 18 may be braced with for instance struts 20. Platform 18 supports equipment, to be described below, relative to grade level 22. An endless belt device, such as a conveyor 24 (shown in dotted lines), extends into the plane of FIG. 1 to move the food product, such as candies, pastries, cakes or other like items 26, also shown in phantom lines, through apparatus 10. Conveyor 24 is optionally integral to, or separate from, apparatus 10.

Apparatus 10 has a manifold assembly 28 which is supported from structure 12. The manifold assembly 28 is formed of a supply conduit 30 and a fluid manifold 32. Supply conduit 30 has a port 34 through which the viscous flowable mass, such as icing, is introduced into the assembly 28. In a preferred embodiment, the supply conduit 30 is formed of a receiving section 36 and forwarding sections 38 and 40. In a more preferred embodiment, the receiving section 36 is substantially parallel to conveyor 24. However, the receiving section need not be substantially parallel and other orientations consistent with enabling mass flow therethrough for delivery to fluid manifold 32 can be employed. The viscous flowable mass passes from the forwarding sections 38 and 40 to fluid manifold 32 through which it is distributed to nozzles 42, only two of which are shown. The nozzles 42 deposit the flowable mass on the product surface 26 as described below.

In the invention, the manifold assembly 28 is linearly displaceable. The displacement is in the form of a reciprocating linear motion. The direction of the linear motion of manifold assembly 28 in relation to the direction of movement of conveyor 24 can be varied from perpendicular to skewed up to an angle of about 150°. In a preferred embodiment, the manifold 28 is oriented at 45° or 135° with reference to the horizontal plane of the product conveying system. This orientation can be adjusted to any desired angle. The speed of reciprocating motion of the manifold relative to the speed of the product conveyor passing beneath the depositor while the fluid mass is being deposited produces the pattern on the product surface. By changing the speed of one or both of the reciprocating manifold and the conveyor, one can vary the ornamented characteristics of the pattern such as the radius of a curve, the orientation of a line or wave etc. Additionally, the number of nozzles, their orientation relative to the product being conveyed and the stroke length; that is to say, the displacement distance, can also be varied as will be explained below.

The manifold assembly 28 is linearly displaceable by a drive system 44 and a linear motion assembly 46. Drive system 44 is positioned on platform 18 and includes a motor 48 which has a keyed drive shaft which drives an eccentric 50. The center of the eccentric is displaced from the center of the drive shaft. A mass or eccentric follower 52 with a ball bearing surrounds eccentric 50. A connecting arm 54 is attached by, for instance, a pin 56 in a clevis 58 of the follower 52. The drive system arrangement functions in a manner similar to known mechanisms for converting rotary motion to linear motion. The connecting arm 54 is attached at, or near, its opposite end 60 to manifold hanger 62. In FIG. 1, the hanger 62 is behind the manifold assembly 28.

Figure 2:
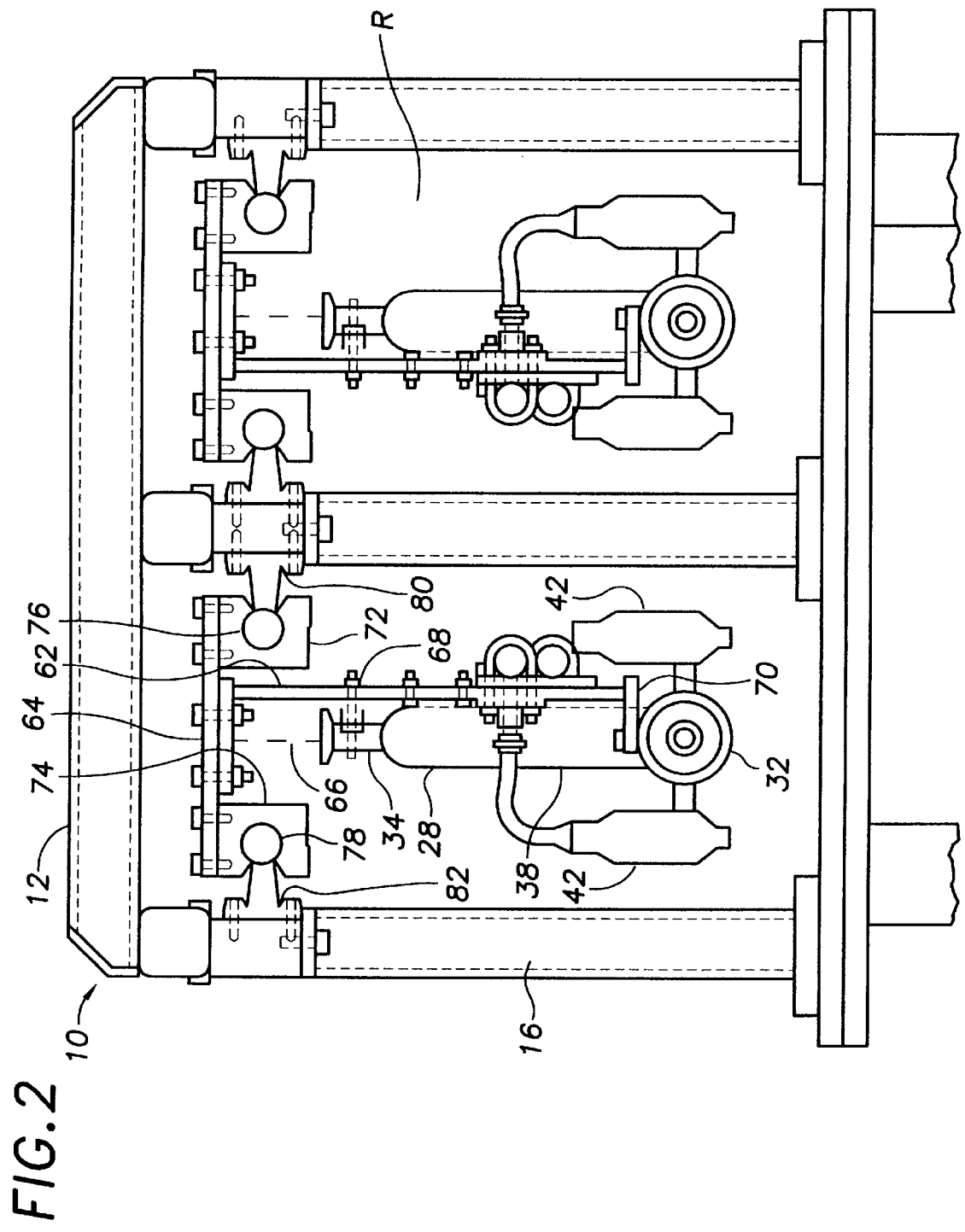
FIG. 2 shows an end elevation view of the apparatus along view line A—A of FIG. 1.

Referring to FIG. 2, the conveyor 24 carrying the product 26 such as a food, pastry or the like is travelling from the left to the right.

As is shown in FIG. 2, hanger 62 is affixed to an upper plate 64 and is suspended therefrom. Linear bearings 72 and 74, which are assembled on linear rails 76 and 78, respectively, are attached to plate 64. Rails 76 and 78 are supported by structure 16. The manifold 28 is affixed to the hanger 62 by, for instance, a U bolt 68 to stabilize the manifold and maintain its relative position. At a forward section, the hanger 62 can have an L section 70 which is affixed to fluid manifold 32 for additional positioning and stability.

The linear bearings 72 and 74 travel on and along the rail assemblies 76 and 78, respectively, each of which are respectively supported by rail supports 80 and 82. The rail supports 80 and 82 are attached to, for instance, vertical support 16 preferably by conventional bolting arrangements.

In operation, the manifold hanger 62, which is affixed to the connecting arm 54 (FIG. 1), is displaced in a reciprocating motion into and out of the plane of FIG. 2 causing the manifold assembly 28 to also reciprocate. When the manifold assembly is in motion, the linear bearings 72 and 74 move along the rail assemblies 76 and 78.

The period of one complete reciprocating cycle can be varied preferably by means of a variable speed drive. However, the eccentric 50 can also be changed to vary the stroke length. Each of these modifications can be made independently of each other. It is also contemplated that both modifications can be made to the apparatus to provide further flexibility for obtaining pattern variations.

Still referring to FIG. 2, in a preferred embodiment, the invention includes a second manifold assembly, eccentric, linear motion system, nozzle, hanger, rail, and rail assembly adjacent to that described above and is generally designated in FIG. 2 as R. R is essentially a duplicate of the above-described arrangement but in operation would be 180° out of phase with the first manifold assembly. That is to say that when manifold assembly 28 is moving toward the reader out of the plane of the Figure, assembly R is moving into the plane of the Figure. As will be appreciated, the availability of a second manifold assembly enables one to form a larger number of designs as well as more intricate and/or multi-colored designs on the product. The second manifold assembly R optionally can be reciprocated using the same drive system 44. Of course, the second manifold assembly R could be linearly displaced using a separate drive system which would add an additional variable parameter thus permitting additional variations in ornamentation. The manifolds reciprocate in an opposite direction to one another at the desired cycles per minute (cpm) to produce the pattern.

The flowable or viscous material to be deposited is delivered to the apparatus of the invention from an external storage and pumping system (not shown). Preferably, the viscous flowable mass, when introduced into the one or more manifolds is at a pressure of approximately 30 to 100 psig and a temperature of approximately 120° F. to 180° F. The temperature and pressure conditions of the flowable material will vary depending on the make-up of the viscous mass. The temperature is selected so as to maintain the desired degree of fluidity of the mass under the conditions of operation without causing degradation of the mass. If the viscous material is a confectionery paste such as an icing, the material is maintained at a temperature of approximately 120° F. to 140° F. The viscous mass is discharged preferably under pressure through the spray gun nozzles 42 each of which is equipped with a suitable orifice size depending on the desired design characteristics. Each row of product preferably utilizes two (2) to four (4) spray guns. That is to say, there is preferably at least one spray gun on each fluid manifold for each row of product passing beneath. As shown in FIG. 2, manifold 32 may have spray guns on each side so that at least 2 spray guns are associated with each manifold assembly for a total of 4 spray guns per row of product. Of course, additional spray guns can be included.

In the invention, at least one of the manifold assembly 28, the supply conduit 30, fluid manifold 32 and the fluid nozzles 42 are heated. In a preferred embodiment, the manifold assembly is heated and more preferably the heating is by heat tracing 84 shown in FIG. 1. The heat tracing is in contact with a thermally conductive material, i.e., such as a stainless steel surface which is a preferred material of construction of the manifold assembly 28. The heat tracing is sandwiched between the manifold outer surface and an outer insulating layer 86 also shown in FIG. 1. Other heating systems using jacketing can be used in place of, or in supplement to, the resistance heater element(s).

In still a more preferred embodiment, each of the nozzles 42 is also heat-wrapped with heat tracing 88, or a band heater. In a preferred embodiment the heat-wrapped or heat-traced component, such as the nozzles and manifold assembly are heated by electrical or resistance heating so that the viscous material contained therein, or flowing therethrough, is maintained in a desired condition, i.e., pre-selected temperature, pressure and flow rate ranges to maintain fluidity, avoid large viscosity increases and, if necessary, retard premature crystallization of the viscous mass, such as an icing containing a component with a tendency to crystallize, i.e. confectionery sugars. The nozzles 42 are off the shelf items and can be obtained for instance from Spray Systems Technology. Optionally, the nozzles are equipped with air atomization and preferably, have changeable tips or orifices. The ability to change nozzle tips provides yet another or supplemental means for generating icing or viscous mass strips of different thickness or contour so as to vary the ornamental design. Further, by the intermittent operation of one or more selected nozzles, one can obtain additional variations of patterns. The intermittent operation is preferably automatically performed, i.e., by a timer. Preferably the nozzles are air actuated nozzles which can be used to further avoid or minimize nozzle orifice plugging and to provide a positive shut-off capability.

In the invention, the temperature of the viscous flowable material is preferably controlled throughout the storage, distribution and depositing elements of the machine. The temperature can be controlled by directly sensing a temperature of the viscous mass or by sensing a temperature of a surface or component which is in direct contact with the mass. The temperature is preferably sensed at the closest point to the deposit of the viscous mass with one (1) temperature probe for each manifold.

The temperature measurement is transmitted to a controller which can regulate the energy output, i.e. power or current, to the heating means such as the trace wrapping or heating coil. The control system monitors the fluid temperature and initiates wattage adjustments to maintain set-point temperature. The speed of adjustment is a set-point and is maintained as well. The electrical wiring, temperature probe wiring, transmitter wiring and connections all preferably have flexible cords and are routed through a wireway on the back side of the manifold.

When the apparatus of the invention has more than one manifold assembly as indicated in FIG. 2, the assemblies can be supplied by a single or separate supply lines. When two assemblies 28 are employed, each of the manifold assemblies is optionally supplied with a viscous fluid mass with different properties such as a different color icing material or an icing material of a different consistency or composition to produce a different or enhanced ornamental effect.

In a preferred embodiment, the apparatus has two manifold assemblies 28 driven by a single drive system 44. The use of a single drive system minimizes or eliminates vibration since each of the manifold assemblies is operating 180 degrees out of phase from the other, i.e. each is at the opposite end of its stroke or cycle. Of course, the apparatus of the invention may have a separate drive system for each manifold assembly but this is less preferred due to difficulties in synchronization which may result in vibration from the reciprocating action and may require vibration absorbing or dampening or other balancing measures known in the art.

Figure 4:
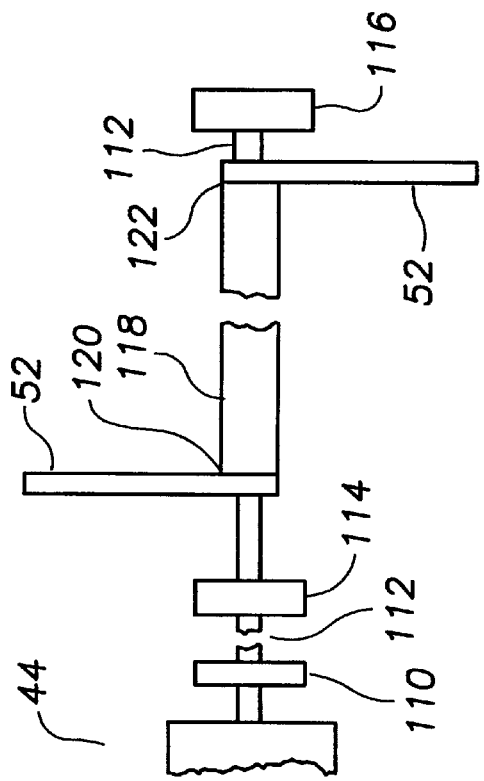
FIG. 4 shows a side view along view line A—A of FIG. 3.
Figure 3:
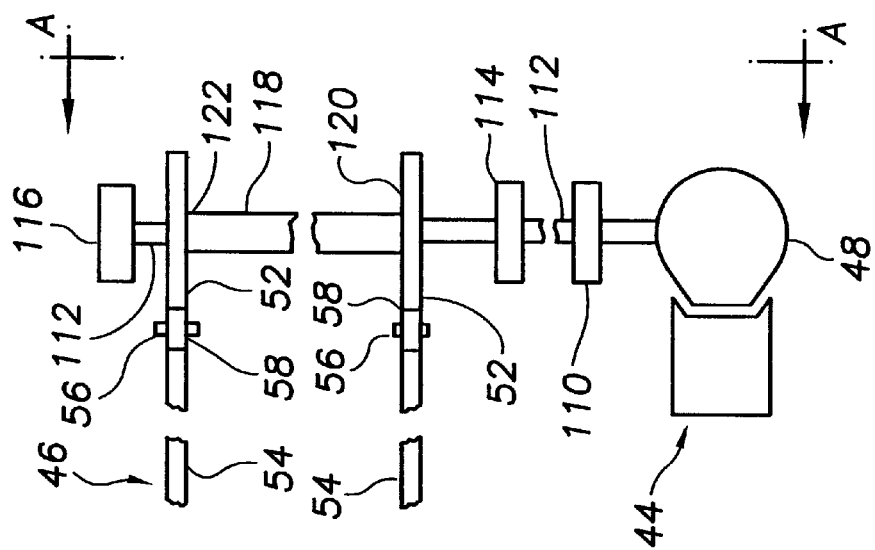
FIG. 3 shows in plan view an arrangement of a single drive system and two manifold assemblies.

FIGS. 3 and 4 show the drive system 44 in plan (FIG. 3) and in end view (FIG. 4) and in particular for use in apparatus 10 when there are two manifold assemblies 28 driven by a single drive system. As indicated, motor 48, which may have a gear reducing box (not shown) is coupled, through a coupling 110, to drive shaft 112 which extends through pillow block bearings 114 and 116, the latter being supported directly and/or indirectly by structural members. Shaft 112 extends through a sleeve 118. The sleeve is preferably removably affixed to the drive shaft. At, or near, each end 120 and 122 of sleeve 118, there are securely attached eccentric masses 50. Also shown are connecting arms 54 attached to the eccentric follower 52 at a peripheral point thereof through pin 56 and clevis 58.

As discussed above, the stroke length, i.e. distance of travel of manifold assembly 28, can be changed by changing the eccentric to one with different dimensions or offset from the center. In the above discussed embodiment, sleeve 112 can be replaced with another sleeve having one or more eccentrics.

In the embodiment where a single manifold is used, a counterbalance is employed in the drive system. The counterbalance can be a weight or mass sized and positioned to counterbalance the forces generated by the reciprocation of manifold assembly 28. The counterbalance can be a second eccentric mounted on the shaft 112 or sleeve 118. For instance, referring to FIG. 4, if there is a single manifold assembly employed, and if the left-most eccentric 50 and follower 52 are connected through arm 54 to the manifold assembly 28, the mass near the opposite end of the shaft 112 or sleeve 118 could be, but need not be, an eccentric of appropriate mass and position so that it, during operation, would generate a force or forces sufficient to counteract those resulting from to the reciprocation of manifold assembly 28.

In the embodiment where more than one manifold assembly is employed, the eccentric and follower along with connecting arm for the second manifold assembly essentially operate to convert rotary motion into linear motion and the counterbalancing forces to the reciprocating motion of the first manifold assembly 28 are counterbalanced, at least to a large part, by the reciprocating motion of the second manifold assembly.

The manifold assembly 28 can be reoriented relative to the conveyor by rotating the assembly about a pivot point. The pivot point is spaced from the non-drive end of the apparatus and is physically located beyond the furthermost nozzle. The pivot point is on the center line of the apparatus and is preferably beyond the outermost edges of the conveyor surface.

In a preferred embodiment, the manifold assembly has support legs which are firmly secured to a movable plate which sits on a fixed plate. A pin extends from the underside of the movable plate and through the fixed plate. The top plate is maintained in position by bolts. When reorientation is desired, the fasteners are removed and the pivotable plate is rotated about the pivot pin either manually or automatically.

In a still more preferred embodiment, the apparatus can be pivoted using an overhead rail assembly with at least two vertically extending trolley arms. The overhead rail is formed as an arc including the arc consistent with the degree of angular readjustment.

Where the machine orientation relative to the conveyor is changed, the effective length of the connecting rod, which has threaded-end adjustability, is changed by loosening or tightening the rod end so that each of the nozzles of the manifold assemblies is centered with respect to each row of product at the mid-point of the stroke length.

The range of stroke length is defined by the conveyor width, the piece to be decorated, the position and number of nozzles, and the desired pattern.

In the practice of the invention, conveyor 24 will operate at a certain linear speed within the range of about 40 to about 70 fpm.

FIGS. 5A to 5J show a sampling of various ornamental designs which can be formed on the product surface by the depositing apparatus of the invention. The sample patterns are wave-like in appearance with variations in orientation and peak-to-peak distance and in particular a multiple-wave-like design.

The design shown in 5A can be formed using two manifold assemblies operating at a chosen frequency, i.e. cycles per minute (cpm). The higher the frequency, the smaller the distance between adjacent peaks if one views the design as one or more skewed sine waves. To obtain this design, the manifold assembly is oriented at 45° relative to the direction of movement of the product conveyor.

Figure 5E:
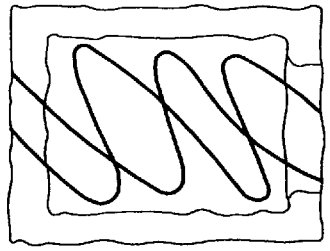
FIGS. 5A to J show a few of the patterns obtainable by the apparatus of the invention illustrating varying degrees of intricacy.
Figure 5D:
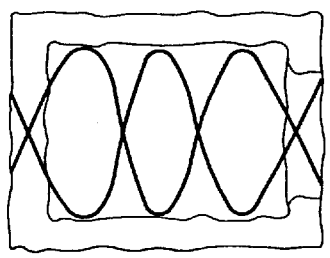
Figure 5C:
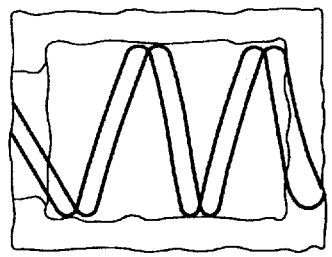
Figure 5B:
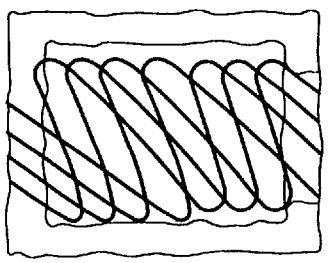
Figure 5A:
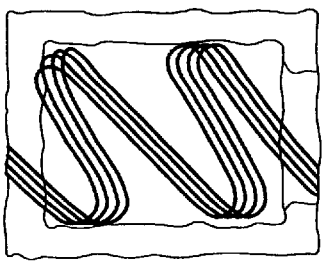
Figure 5J:
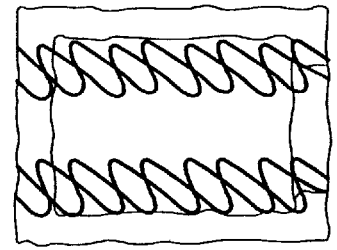
Figure 5I:
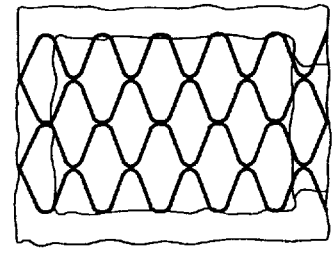
Figure 5H:
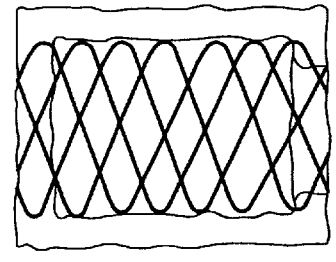
Figure 5G:
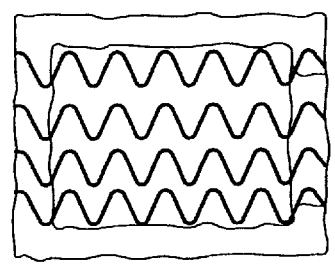

The pattern of FIG. 5B illustrates the design obtained if the relative orientation of the depositor to the conveyor is about 90°.

The pattern of FIG. 5C requires a 90° relative orientation and speed control.

Figure 5F:
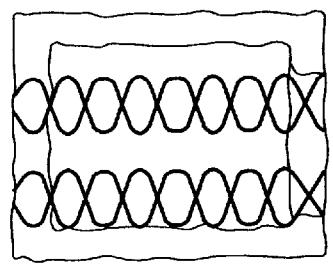

The patterns of FIGS. 5D and 5F require the use of 2 manifold assemblies.

The pattern of FIG. 5E requires the same as the pattern of FIG. 5D with speed control as in FIG. 5C.

The patterns of FIGS. 5G to 5J require a 90° relative orientation and speed control.

The parameters are summarized in the following Table. The Conveyor Speed Y is given in feet per minute (fpm) and the Manifold Assembly Orientation is relative to the conveyor. The Applicator Speed in cycles per minute is set forth in terms of the Conveyor Speed. For instance, for pattern C, if the Conveyor Speed is 50 fpm, the Applicator Speed would be 60 cycles per minutes

TABLE I

| Pattern | Conveyor Speed (fpm) | Manifold Assembly Orientation | Applicator Speed (cpm) | No. of Depositing Nozzles per Row of Product |
|---|---|---|---|---|
| "A" | (Y) | 45° | 3 × (Y) | 2 |
| "B" | (Y) | 90° | 3 × (Y) | 2 |
| "C" | (Y) | 90° | 1.2 × (Y) | 2 |
| "D" | (Y) | 45° | 4 × (Y) | 4 |
| "E" | (Y) | 45° | 2.5 × (Y) | 4 |
| "F" | (Y) | 45° | 5 × (Y) | 4 (Offset) |
| "G" | (Y) | 90° | 5 × (Y) | 4 (Offset) |
| "H" | (Y) | 90° | 3 × (Y) | 4 |
| "I" | (Y) | 90° | 5 × (Y) | 4 (Offset) |
| "J" | (Y) | 90° | 5 × (Y) | 4 (Offset) |

The terms and expressions which have been employed are used as terms of description and not of limitation, and there is no intention in the use of such terms and expressions of excluding any equivalents of the features shown and described or portions thereof, it being recognized that various modifications are possible within the scope of the invention.

I claim:

1. Apparatus for depositing a heated viscous fluid containing crystallizable, gelatin-like or fatty-based materials for decorating food products comprising;

(a) linearly moveable manifold assembly means having at least one nozzle means for distributing said viscous fluid to be deposited;

(b) counterbalance eccentric drive means;

(c) linear motion assembly means operatively connected to said drive means and said manifold assembly means to cause an approximately linear displacement of said manifold assembly means along a predetermined path;

(d) heating means positioned and arranged for heating said manifold means and/or said nozzle means;

(e) temperature sensing means associated with said manifold means and/or said nozzle means; and (f) means in communication with said heating means to control said heating means in response to said temperature sensing means to maintain said viscous fluid in a flowable state.

2. Apparatus of claim 1 further comprising platform means to support a food product on which said viscous fluid is to be deposited and means to move said platform means.

3. Apparatus of claim 1 wherein linear motion assembly means converts rotational motion of the eccentric means into reciprocating linear motion.

4. Apparatus of claim 3 wherein the linear motion assembly means comprises at least one connecting rod means operatively connected to said manifold means and said eccentric drive means.

5. Apparatus of claim 3 wherein said drive means includes drive shaft means with a counterbalance mass eccentrically mounted on said drive shaft means.

6. Apparatus of claim 1 wherein said manifold assembly means comprises a supply conduit and a fluid manifold.

7. Apparatus of claim 1 comprising two manifold assembly means.

8. Apparatus of claim 6 wherein the manifold assembly means are driven by single drive means.

9. Apparatus of claim 7 comprising two linear motion assembly means.

10. Apparatus of claim 1 further comprising rail means positioned and arranged to guide said manifold assembly means.

11. Apparatus of claim 1 wherein said heating means comprises heat tracing or wrapping.

12. Apparatus of claim 3 wherein said manifold assembly means has at least two independently operated nozzle means.

13. Apparatus of claim 1 wherein said manifold assembly means and said nozzle means are heat traced.

14. Apparatus of claim 2 wherein said means to move said platform means is provided with adjustable speed means.

15. Apparatus of claim 2 further comprising means to adjust the position of said manifold assembly means relative to said platform means.

16. Apparatus of claim 1 further comprising pressure measuring means associated with said manifold means to measure the pressure of said viscous fluid flowing therethrough.

* * * * *